United States Patent
Boghosian et al.

(10) Patent No.: US 10,033,915 B2
(45) Date of Patent: Jul. 24, 2018

(54) CAMERA PERIPHERAL DEVICE FOR SUPPLEMENTAL AUDIO CAPTURE AND REMOTE CONTROL OF CAMERA

(71) Applicant: GoPro, Inc., San Mateo, CA (US)

(72) Inventors: Lisa Boghosian, San Francisco, CA (US); Jesse Baker, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/681,147

(22) Filed: Aug. 18, 2017

(65) Prior Publication Data

US 2017/0347010 A1  Nov. 30, 2017

Related U.S. Application Data

(63) Continuation of application No. 15/209,717, filed on Jul. 13, 2016, now Pat. No. 9,787,887.

(60) Provisional application No. 62/193,541, filed on Jul. 16, 2015.

(51) Int. Cl.
*H04N 5/232* (2006.01)
*G11B 27/10* (2006.01)
*G10L 15/22* (2006.01)

(52) U.S. Cl.
CPC ......... *H04N 5/23203* (2013.01); *G11B 27/10* (2013.01); *H04N 5/23245* (2013.01); *G10L 2015/221* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2009/0253463 A1* | 10/2009 | Shin | H04M 1/72583 455/563 |
| 2016/0091964 A1* | 3/2016 | Iyer | G02B 27/017 345/633 |
| 2016/0231818 A1* | 8/2016 | Zhang | G06F 3/017 |

\* cited by examiner

*Primary Examiner* — Stephen Coleman
(74) *Attorney, Agent, or Firm* — Young Basile Hanlon & MacFarlane, P.C.

(57) ABSTRACT

A peripheral device (e.g., a small wearable device) may operate in conjunction with a camera to enable in-the-moment capture and control. The peripheral device may receive voice commands and uses voice recognition to generate a control signal to control the camera, thereby enabling users to freely participate in their activities while seamlessly controlling the camera in a hands-free manner. Additionally, the peripheral device may operate as a wireless microphone source to capture high quality audio for instead of or in addition to audio captured by the camera. This may provide improved audio quality in certain operating conditions such as during narrating and interviewing.

20 Claims, 6 Drawing Sheets

CAMERA PERIPHERAL DEVICE FOR SUPPLEMENTAL AUDIO CAPTURE AND REMOTE CONTROL OF CAMERA

RELATED APPLICATIONS

This application is a continuation of U.S. application Ser. No. 15/209,717, filed Jul. 13, 2016, now U.S. Pat. No. 9,787,887, which application claims the benefit of U.S. Provisional Application No. 62/193,541 filed on Jul. 16, 2015, all of which is incorporated by reference herein.

BACKGROUND

Technical Field

This disclosure relates to a camera peripheral device, and more specifically, to a device for capturing supplemental audio and remotely controlling a camera using voice recognition.

Description of the Related Art

In action cameras used during activities such as skiing, snowboarding, surfing, biking, etc., users often do not have direct access to the camera because the camera is mounted on a helmet, chest, or object out of the user's reach. Furthermore, the camera may be integrated with or attached to an unmanned aerial vehicle that captures aerial images or video of the user. Even if the user can reach the camera, the user is often otherwise focused on the activity and it may be unsafe or inconvenient to operate the camera by hand. Thus, the user is often not in a position to control the camera directly through interface buttons on the camera. Voice recognition systems enable operation of a camera in a hands-free manner. However, when the camera is positioned remotely from the user, a voice recognition system on the camera may be unable to accurately pick up the commands. Furthermore, if the camera is out of view or hearing range of the user, the camera is unable to provide adequate feedback to the user indicating whether or not a command is received.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates an example of a camera system in accordance with one embodiment.

DETAILED DESCRIPTION

Figure 1:
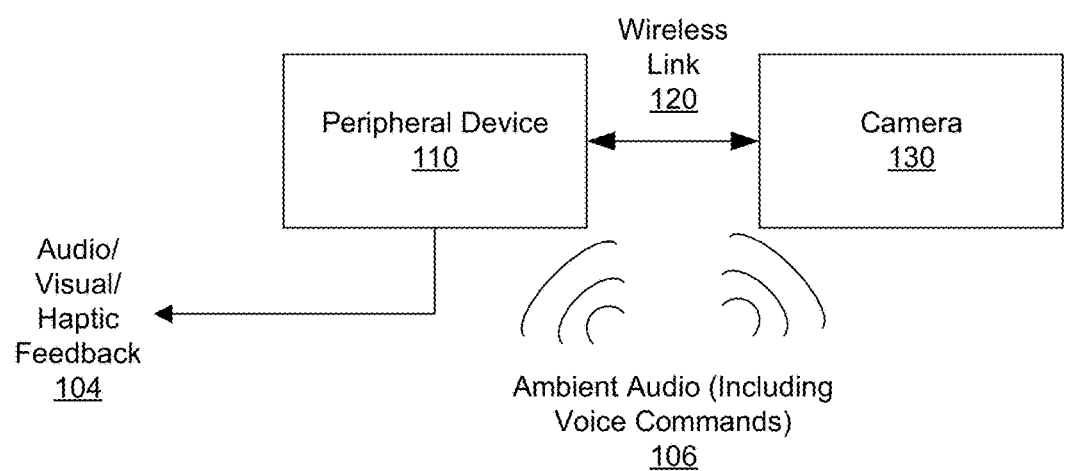

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A peripheral device (e.g., a small wearable device) may operate in conjunction with a camera to enable in-the-moment capture and control. The peripheral device may receive voice commands and uses voice recognition to generate a control signal to control the camera, thereby enabling users to freely participate in their activities while seamlessly controlling the camera in a hands-free manner. Additionally, the peripheral device may operate as a wireless microphone source to capture high quality audio for instead of or in addition to audio captured by the camera. This may provide improved audio quality in certain operating conditions such as during narrating and interviewing.

In a particular embodiment, a camera system may comprise a camera to capture video and a peripheral device wirelessly communicating with the camera. The peripheral device may comprise one or more microphones to capture ambient audio including voice commands, a processor, and a feedback mechanism. The processor may recognize one or more of the voice commands captured by the microphones, generate a control signal to control a function of the camera based on the recognized command, and receive an acknowledgment message in response to the camera executing the recognized command. The feedback mechanism may provide feedback to the user in response to receiving the acknowledgement message that is indicative of the recognized command.

In another embodiment, a method may operate a peripheral device in communication with a camera. A wireless connection may be established between the peripheral device and the camera. The peripheral device may capture ambient audio. A first command may be received by the peripheral device indicative of a request to enter a narration mode. In response to recognizing the first command, a first control signal may be transmitted to the camera to configure the camera to use the ambient audio captured by the peripheral device as a primary audio source for video captured by the camera. Furthermore, the ambient audio may be transmitted to the camera.

A second command may be received by the peripheral device. The second command may be indicative of a request to exit the narration mode. In response to recognizing the second command, a second control signal may be transmitted to the camera to configure the camera to use ambient audio captured by the camera as the primary audio source for video captured by the camera. Furthermore, the ambient audio may be transmitted to the camera.

In yet another embodiment, a method may operate a camera in communication with a peripheral device. A wireless connection may be established between the camera and the peripheral device.

A first control signal may be received from the peripheral device indicative of a request to enter a narration mode. In response to receiving the first control signal, ambient audio captured by the peripheral device may be received while the camera is recording the video. The received ambient audio captured by the peripheral device may be encoded by the camera as a primary audio source for the video. A second control signal indicative of a request to exit the narration mode may be received from the peripheral device. In response to receiving the second control signal, the camera may capture ambient audio while the camera is recording the video and encode the ambient audio captured by the camera as the primary audio source for the video.

In other embodiments, a computer-readable storage medium may store computer-executable instructions that when executed cause a processor to perform the processes described above.

Example Camera Environment

FIG. 1 illustrates an embodiment of a camera environment 100 including a camera 130 coupled to a peripheral device 110 via a wireless link 120. In alternative embodiments, different or additional devices may be present.

The peripheral device 110 may comprise a user-wearable or user-carried electronic device that controls operation of the camera 130 based on voice or other user commands captured by the peripheral device 110, and furthermore may operate as an audio capture device to capture audio in synchronization with video captured by the camera 130. In one embodiment, the peripheral device may be mountable on a wrist, collar, or clothing and is made of a lightweight, waterproof, and rugged material. In one embodiment, the connection between the peripheral device 110 and the camera 130 imay be via a peer-to-peer wireless communication protocol such as, for example, a Bluetooth protocol or Wifi Direct protocol. In other embodiments, the peripheral device 110 may communicate indirectly with the camera 130 via a network. In other embodiments, wired connections may be used.

In general operation, the peripheral device 110 may capture and record ambient audio 106. The peripheral device 110 may detect and recognize voice commands in the captured audio. The peripheral device 110 may then generate a control signal to control operation of the camera 130 based on the voice commands or other manually entered commands (e.g., via an interface button or touch screen on the peripheral device 110). For example, the peripheral device 110 may control the camera 130 to turn on or off, start or stop recording video, take a picture, take a burst photo, change an operating mode, or configure a setting of the camera 130. The peripheral device 110 furthermore may provide feedback in the form of, for example audio feedback (e.g., beeps, voice feedback, etc.), visual feedback (e.g., via LEDs or LCD display), and/or haptic feedback (e.g., via a vibration motor). The feedback may indicate, for example, whether the peripheral device 110 successfully received a command, which command it received, and whether the command was successfully communicated to the camera 130.

The camera 130 may operate in response to the control signal from the peripheral device 110 and may further operate based on direct inputs to the camera 130 (e.g., via an interface button or touch screen on the camera 130). The camera 130 may capture and stores video and/or images in response to the controls and may furthermore capture ambient audio 106 in parallel with or instead of the peripheral device 110.

In one embodiment, the peripheral device 110 may furthermore operate as an additional or substitute source of audio for the video captured by the camera 130. For example, in one embodiment, the camera 130 and the peripheral device 110 may be configurable to enable either device to operate as the primary source of audio for the captured video. Here, the primary source of audio may by default encoded together with the video as the audio track for the video captured by the camera 130. The operation of associating the captured audio from the primary audio source with the captured video frames may be performed in the camera 130 or in a separate processing device (e.g., a server or editing client). In one embodiment, only the device configured as the primary source of audio may capture audio and stores audio and the other non-primary device does not capture audio. Alternatively, the non-primary device may operate as a secondary source of audio. When configured as a secondary source of the audio, the device (camera 130 or peripheral device 110 depending on the configuration) may record and stores audio as a secondary stream of audio. The secondary stream of audio may not automatically encoded with the video but may instead be stored and/or communicated in association with the video as a separate audio track or file. During subsequent editing a user may choose to replace the primary audio track with the secondary audio track or combine the tracks together to create a combined audio track. For example, the primary and secondary audio streams may be combined by the camera 130 according to a predefined or user-configurable weighting such as, for example, 70% primary audio and 30% secondary audio.

In one embodiment, the camera system 100 may be configurable between a narration mode in which the peripheral device 110 operates as the primary audio source and a standard mode in which the camera 130 operates as the primary audio source. The narration mode may generally be useful, for example, when the user is narrating the captured video content, when the user is conducting an interview, or in other scenarios when audio originating from the user wearing the peripheral device 110 represents an audio source of higher interest than audio sources closer to the camera 130. In contrast, the normal mode may be useful when the subject of the scene being captured by the camera is providing the audio of interest.

Example Peripheral Device Configuration

Figure 2:
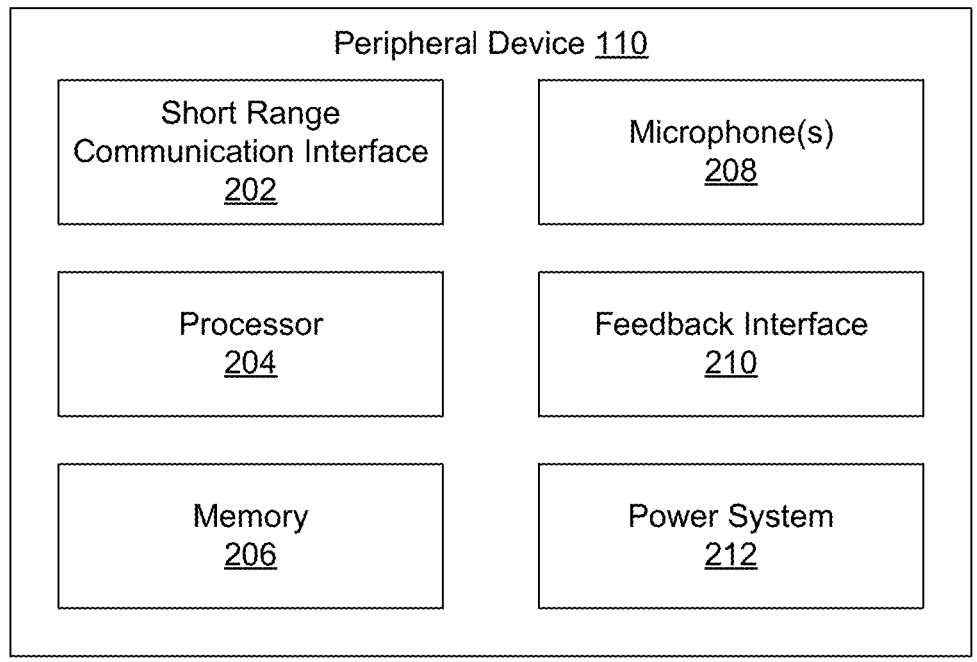
FIG. 2 illustrates an example of a peripheral device in accordance with one embodiment.

FIG. 2 illustrates an example embodiment of a peripheral device 110 which may comprise a short range communication interface 202, a processor 204, a memory 206, one or more microphones 208, a feedback interface 210, and a power system 212.

The processor 204 comprises a general purpose or application specific processor that may process instructions from the memory 206 (e.g., a non-transitory computer readable storage medium) to carry out the functions attributed to the peripheral device 110 described herein. The memory can be a volatile or non-volatile storage medium that may store instructions for execution by the processor 204 and may additionally audio data captured by the microphone(s) 208, control parameters, or other information used to operate the peripheral device 110.

In particular, in one embodiment, the memory may comprise a non-transitory computer-readable storage medium that stores an application comprising instructions executable by the processor for carrying out the functions of the application described herein. In one embodiment, the application may include, for example, a voice recognition module that recognizes a set of predefined voice commands as will be discussed in further detail below. Furthermore, the application may perform other audio processing functions such as, for example, separating and removing voice commands from recorded audio so that the commands are muted in the audio track of the recorded video. The application may furthermore control various other operational functions of the peripheral device 110 described herein such as controlling feedback signals, controlling communications with the camera 130, or processing manual user inputs.

The microphone(s) 208 may comprise one or more audio capture devices. In one embodiment, the microphone(s) may include multiple waterproof microphones. The microphone(s) 208 may include capabilities to reduce wind noise either based physical design or through signal processing algorithms.

The short range communication interface 202 may communicate with the camera 130 to provide a control signal to the camera 130 based on captured commands and to receive feedback signals from the camera 130. In one embodiment, when the peripheral device 110 is configured as a primary or secondary audio source, the audio captured by the peripheral device 110 is transmitted to the camera 130 as it is being captured (e.g., in real time) and synchronized with or otherwise associated with the video captured by the camera 110. The communication interface 240 may operate according to a wired or wireless protocol such as, for example, Bluetooth, WiFi Direct, or other communication protocol.

The input/output interface 210 may include mechanical or electronic mechanisms to provide feedback to the user in the form of, for example, visual, audio, and/or haptic feedback. The feedback mechanism may indicate, for example, if a command is received, which command is received, if the command has been successfully executed, or if an error condition occurs. For example, in one embodiment, the input/output interface 210 includes one or more light emitting diodes (LEDs) which may be of different colors or positioned in different locations on the peripheral device 110 to communicate different feedback information. In another embodiment, an LCD display may be provided. The input/output interface 210 may furthermore include one or more speakers to output audio feedback in the form of, for example, beeps which may vary in length (e.g., a short beep and a long beep) or spoken words. In one embodiment, the speakers may be used to communicate confirmation of received commands and/or battery status (e.g., when the battery is low). The input/output interface 210 may furthermore include a haptic feedback device such as vibration motor that can vibrate according to pulses of different durations to communication feedback to the user (e.g., confirmation of commands and/or low battery).

In one embodiment, the input/output interface 210 furthermore includes one or more buttons for controlling the peripheral device 110. For example, in one embodiment, the peripheral device 110 may include a first button for controlling power and pairing to the camera 130 and a second button for various control functions. Alternatively, a single button may be used for both functions. The one or more buttons may distinguish between multiple types of presses to interpret different input commands (e.g., short press, long press, super long press, and double click).

The power system 212 may include a battery and related circuitry for providing power to the peripheral device 110. For example, the peripheral device 110 may include a charging port (e.g., a USB port) to recharge the battery of the peripheral device 110. In one embodiment, the charging port may comprise a waterproof sealed connection interface.

Example Camera Configuration

Figure 3:
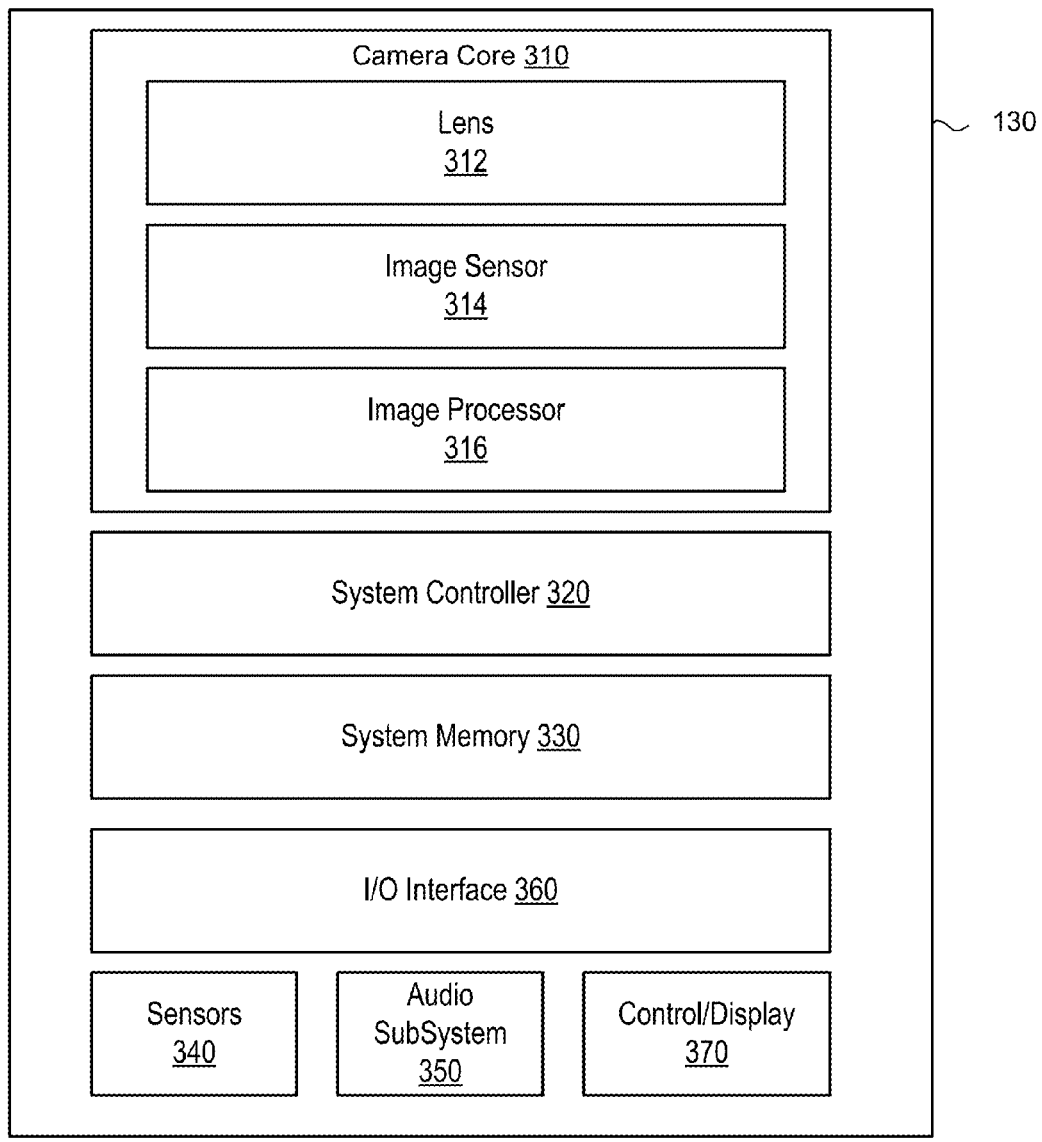
FIG. 3 illustrates an example of a camera in accordance with one embodiment.

FIG. 3 is a block diagram illustrating a camera 130, according to one embodiment. In the illustrated embodiment, the camera 130 may comprise a camera core 310 including a lens 312, an image sensor 314, and an image processor 316. The camera 130 additionally may include a system controller 320 (e.g., a microcontroller or microprocessor) that controls the operation and functionality of the camera 130 and a system memory 330 that may be configured to store executable computer instructions that, when executed by the system controller 320 and/or the image processors 316, perform the camera functionalities described herein. In some embodiments, a camera 230 may include multiple camera cores 310 to capture fields of view in different directions which 130 then be stitched together to form a cohesive image. For example, in an embodiment of a spherical camera system, the camera 130 may include two camera cores 310 each having a hemispherical or hyper-hemispherical lens that each captures a hemispherical or hyper-hemispherical field of view which are stitched together in post-processing to form a spherical image.

In an embodiment, the camera 130 may be integrated with or attached to an unmanned aerial vehicle (e.g., a drone).

The lens 312 can be, for example, a wide angle lens, hemispherical, or hyper-hemispherical lens that focuses light entering the lens to the image sensor 314 which captures images and/or video frames. The image sensor 314 may capture high-definition images having a resolution of, for example, 720 p, 1080 p, 4 k, or higher. For video, the image sensor 314 may capture video at frame rates of, for example, 30 frames per second, 60 frames per second, or higher. The image processor 316 may perform one or more image processing functions of the captured images or video. For example, the image processor 316 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 330 and/or to a non-volatile storage, which may be in the form of internal storage or an external memory card.

An input/output (I/O) interface 360 may transmit and receive data from various external devices. For example, the I/O interface 360 may facilitate the receiving or transmitting video or audio information through an I/O port. Examples of I/O ports or interfaces include USB ports, HDMI ports, Ethernet ports, audio ports, and the like. Furthermore, embodiments of the I/O interface 360 may include wireless ports that can accommodate wireless connections to the peripheral device 110 or other devices. Examples of wireless ports may include Bluetooth, Wireless USB, Near Field Communication (NFC), and the like. The I/O interface 360 may also include an interface to synchronize the camera 130 with other cameras or with other external devices, such as a smart phone, a client device, or a video server.

A control/display subsystem 370 may include various control and display components associated with operation of the camera 230 including, for example, LED lights, a display, buttons, microphones, speakers, and the like. The audio subsystem 350 may include, for example, one or more microphones and one or more audio processors to capture and process audio data correlated with video capture. In one embodiment, the audio subsystem 350 may include a microphone array having two or microphones arranged to obtain directional audio signals.

Sensors 340 may capture various metadata concurrently with, or separately from, video capture. For example, the sensors 340 may capture time-stamped location information based on a global positioning system (GPS) sensor, and/or an altimeter. Other sensors 340 may be used to detect and capture orientation of the camera 230 including, for example, an orientation sensor, an accelerometer, a gyroscope, or a magnetometer. Sensor data captured from the various sensors 340 may be processed to generate other types of metadata. For example, sensor data from the accelerometer may be used to generate motion metadata, comprising velocity and/or acceleration vectors representative of motion of the camera 230. Furthermore, sensor data from the may be used to generate orientation metadata describing the orientation of the camera 230. Sensor data from the GPS sensor may provide GPS coordinates identifying the location of the camera 230, and the altimeter may measure the altitude of the camera 230. In one embodiment, the sensors 340 may be rigidly coupled to the camera 230 such that any motion, orientation or change in location experienced by the camera 230 is also experienced by the sensors 340. The sensors 340 furthermore may associates a time stamp representing when the data was captured by each sensor. In one embodiment, the sensors 340 automatically begin collecting sensor metadata when the camera 230 begins recording a video.

Example Operation of the Peripheral Device

An example voice command set including voice commands that can be recognized by the peripheral device 110 is described below. In one embodiment, the commands discussed below may be preceded by a trigger word in order to improve the detection and accuracy of the voice recognition. For example, a command may be preceded by the word "camera" or another identifying trigger word. The specific syntax of the commands below are merely exemplary and other syntaxes may be used. In some embodiments, each user may program the peripheral device 110 to accept commands based on custom syntaxes.

In response to recognizing a "Wake Up" or "Turn On" command when the camera 130 is off (but the wireless communication interface is enabled), the peripheral device 110 sends a control signal that causes the camera 130 to turn on. The camera 130 turns on in response to the command and outputs a feedback message confirming the command (e.g., 3 beeps and 3 blinks of an LED). The camera 130 may furthermore send an acknowledgement message to the peripheral device 110 and the peripheral device 110 may also provide a feedback message confirming the command (e.g., 3 short buzzes via haptic feedback and/or audio feedback via a speaker and visual feedback via a mode LED according to the same pattern as the camera 130).

In response to recognizing a "Shut Down" or "Turn Off" command when the camera 130 is on, the peripheral device 110 may send a control signal that causes the camera 130 to turn off. The camera 130 turns off in response to the command and outputs a feedback message confirming the command (e.g., 7 beeps via the speaker and 7 blinks of the LED). The camera 130 furthermore sends an acknowledgement message to the peripheral device 110 and the peripheral device 110 may also provide a feedback message confirming the command (e.g., 7 short buzzes via haptic feedback and/or audio feedback via a speaker and visual feedback via a mode LED according to the same pattern as the camera 130).

In response to recognizing a "Record a Video" or "Start Recording" command when the camera 130 is on but not recording, the peripheral device 110 may send a control signal that causes the camera 130 to start recording a video. The camera 130 may start recording a video in response to the command and may output a feedback message confirming the command (e.g., a single beep via the speaker upon starting the recording and 1 blink per second of the LED while recording). The camera 130 furthermore may send an acknowledgement message to the peripheral device 110 and the peripheral device 110 may also provide a feedback message confirming the command (e.g., 1 long buzz via haptic feedback, and/or audio feedback via a speaker and visual feedback via a mode LED according to the same pattern as the camera 130).

In response to recognizing a "Stop Recording" command when the camera 130 is recording video, the peripheral device 110 may send a control signal that causes the camera 130 to stop recording the video. The camera 130 may stop recording the video in response to the command and may output a feedback message confirming the command (e.g., a single beep via the speaker upon stopping the recording followed by a pause and then 3 beeps via the speaker and 3 blinks of the LED). The camera 130 furthermore may send an acknowledgement message to the peripheral device 110 and the peripheral device 110 may also provide a feedback message confirming the command (e.g., one short buzz via haptic feedback followed by a pause followed by 3 short buzzes, and/or audio feedback via a speaker and visual feedback via a mode LED according to the same pattern as the camera 130).

In response to recognizing a "Take a Photo" or "Take a Picture" command when the camera 130 is on, the peripheral device 110 may send a control signal that causes the camera 130 to take a still picture. The camera 130 may take a picture in response to the command and outputs a feedback message confirming the command (e.g., a single beep and single LED blink upon receiving the command and a beep and blink upon capturing the photo). The camera 130 furthermore may send an acknowledgement message to the peripheral device 110 and the peripheral device 110 may also provide a feedback message confirming the command (e.g., one short buzz via haptic feedback and/or audio feedback via a speaker and visual feedback via a mode LED according to the same pattern as the camera 130).

In response to recognizing a "Shoot Burst" or "Take Burst" command when the camera 130 is on, the peripheral device 110 may send a control signal that causes the camera 130 to start capture a burst photo sequence. The camera 130 may start capturing the burst photo sequence in response to the command and may output a feedback message confirming the command (e.g., a single beep upon starting the burst capture and one beep per photo, and a single LED blink upon starting the burst capture and one blink per photo). The camera 130 may furthermore send an acknowledgement message to the peripheral device 110 and the peripheral device 110 may also provide a feedback message confirming the command (e.g., one short buzz via haptic feedback upon starting the burst capture and one buzz per photo, and/or audio feedback via a speaker and visual feedback via a mode LED according to the same pattern as the camera 130).

In response to recognizing a "Highlight" or "Tag It" command when the camera 130 is recording video, the peripheral device 110 may send a control signal that causes the camera 130 to record a metadata tag at the particular time location within the video. The camera 130 may record the metadata tag at the appropriate time point in response to the command and may output a feedback message confirming the command (e.g., confirmed via a display screen if present). The camera 130 furthermore may send an acknowledgement message to the peripheral device 110 and the peripheral device 110 may also provide a feedback message confirming the command (e.g., one short buzz via haptic feedback). The metadata tag can be later used to automatically locate particular time points of interest in the video during editing and playback.

In response to recognizing a "Narrate" command when the camera 130 is recording and when the camera 130 is operating as the primary source of audio, the peripheral device 110 may enter a narrate mode in which it configures itself to be the primary source of audio for the video and sends a control signal that may indicate that the peripheral device 110 is the primary source of audio. In response to the control signal, the camera 130 may configure itself to not record audio or to record as a secondary source of audio. The peripheral device 110 may also provide a feedback message confirming the command (e.g., two long buzzes via haptic feedback, two long blinks via an LED, and a unique two tone sequence via the speakers).

In response to recognizing a "Stop Narrate" command when the camera 130 is recording and when the peripheral device 110 is operating as the primary source of audio, the peripheral device 110 may configure itself to be the secondary source of audio or stop recording audio and sends a control signal that may cause the camera 130 to configure itself to be the primary source of audio. The camera 130 may configure itself to be the primary source of audio in response to the command. The peripheral device 110 may also provide a feedback message confirming the command (e.g., two long buzzes via haptic feedback, two long blinks via an LED, and a unique two tone sequence via the speakers).

Feedback may also be provided by the camera 130 and/or the peripheral device 110 in an error case when the command cannot be executed (e.g., a command to record or take a photo when there is no memory card the memory full, or another error condition). For example, in one embodiment, in response to an error condition, the camera 130 may beep four times and blinks four times, and the peripheral device 110 may similarly buzzes four times, blinks four times, and beeps four times.

In another embodiment, feedback is provided when the peripheral device 110 hears a command but does not recognize it. Here, the peripheral device 110 may output two short buzzes, 2 blinks, and outputs a unique two tone sequence via the speakers.

In one embodiment, the peripheral device 110 may include a first LED (e.g., a mode LED) used to provide feedback when commands are received as described above, a second LED (e.g., a battery state LED) to provide feedback regarding the battery state, and a third LED (e.g., a connection LED) to indicate whether or not the peripheral device 110 is connected to the camera 130. For example, in one embodiment, a low battery may be indicated by an orange blink once per second on the battery state LED, a charging condition may be indicated by turning the battery state LED on to orange on the peripheral device 110, and a fully charged condition may be indicated by turning on a the battery state LED to green on the peripheral device 110.

Furthermore, the connectivity LED may alternate between two colors (e.g., blue and white) when in a pairing or unpairing, periodically blink in a first color (e.g., blue) when paired, and periodically blink a second color (e.g., white) when not paired.

In one embodiment, the camera 130 may alternatively be controlled via a button on the peripheral device 110 in situations where voice commands are not suitable. For example, in one embodiment, a long press of the button when the peripheral device 110 is off may be used to turn the peripheral device 110 on and automatically put it in pairing mode if not already paired. If the peripheral device 110 is on, a long press may turn it off. When on, a single short press may be used to start or stop recording video and a double press may control the camera to capture a photo. A triple press may be used to turn on or off narration mode.

Example Design

Figure 4A:
FIG. 4A illustrates a first view of a peripheral device in accordance with one embodiment.
Figure 4B:
FIG. 4B illustrate a second view of a peripheral device in accordance with one embodiment.

FIGS. 4A and 4B may illustrate example designs of a peripheral device 110. In one embodiment, the peripheral device 110 has a substantially rectangular form factor with L×W×H dimensions of approximately 38 mm×38 mm×11 m. Furthermore, in one embodiment, a front of the peripheral device 110 may include two LEDs on opposite side corners that indicate connectivity and command status and a third LED located near the charging port may indicate a charging and battery status. The illustrated embodiment of the peripheral device 110 may include an integrated clip. Alternative embodiments may lack the integrated clip and instead may be compatible with various separate attachment devices such as a separate clip or wrist housing.

Figure 5:
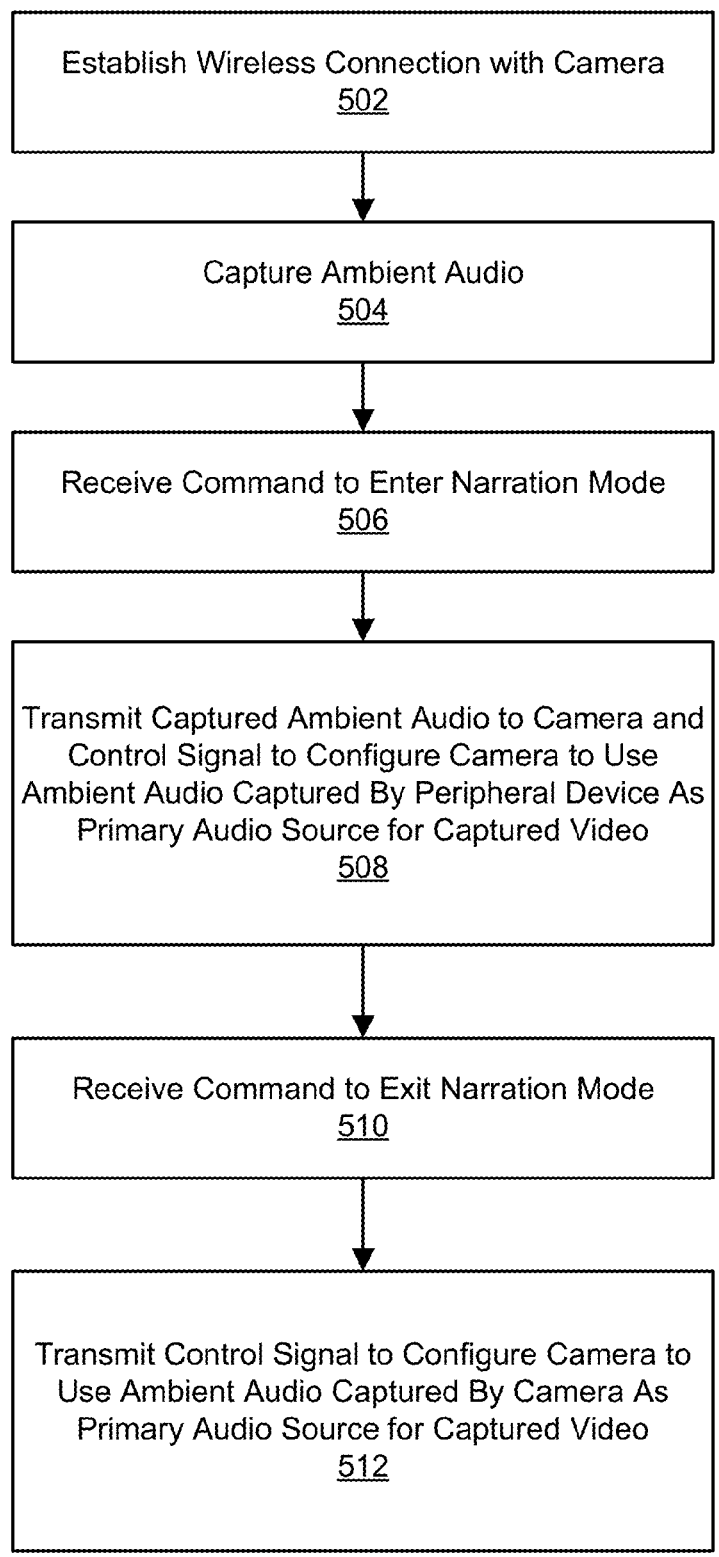
FIG. 5 is a flowchart illustrating an example process for entering an existing a narration mode of a camera system in accordance with one embodiment.

FIG. 5 illustrates an embodiment of a process performed by the peripheral device 110 when entering and exiting narration mode. The peripheral device 110 may establish 502 a wireless connection with the camera 130. The peripheral device 110 may capture 504 ambient audio. The peripheral device may receive 506 a command indicative of a request to enter the narration mode. For example, the command may be in the form of a button press or button press sequence on the peripheral device 110, or may be in the form of a voice command. Alternatively, the command to enter narration mode may be in the form of a wireless signal received from the camera 130 in response to a button press or button press sequence on the camera 130. When the camera is recording video, the peripheral device 110 may transmit 508 the captured ambient to the camera 130 and may transmit a controls signal to configure the camera 130 to use the ambient audio from the peripheral device 110 as the primary audio source for the video it captures. At a later time, the peripheral device may receive 510 a command indicative of a request to exit the narration mode. For example, the command may be in the form of a button press or button press sequence on the peripheral device 110, or may be in the form of a voice command. Alternatively, the command to exit narration mode may be in the form of a wireless signal received from the camera 130 in response to a button press or button press sequence on the camera 130. The peripheral device may transmit 512 a control signal to configure the camera 130 to use the ambient audio captured by the camera as the primary audio source for the video. Optionally, the peripheral device 110 may continue to transfer the audio it captures for use as a secondary audio source for the captured video.

Figure 6:
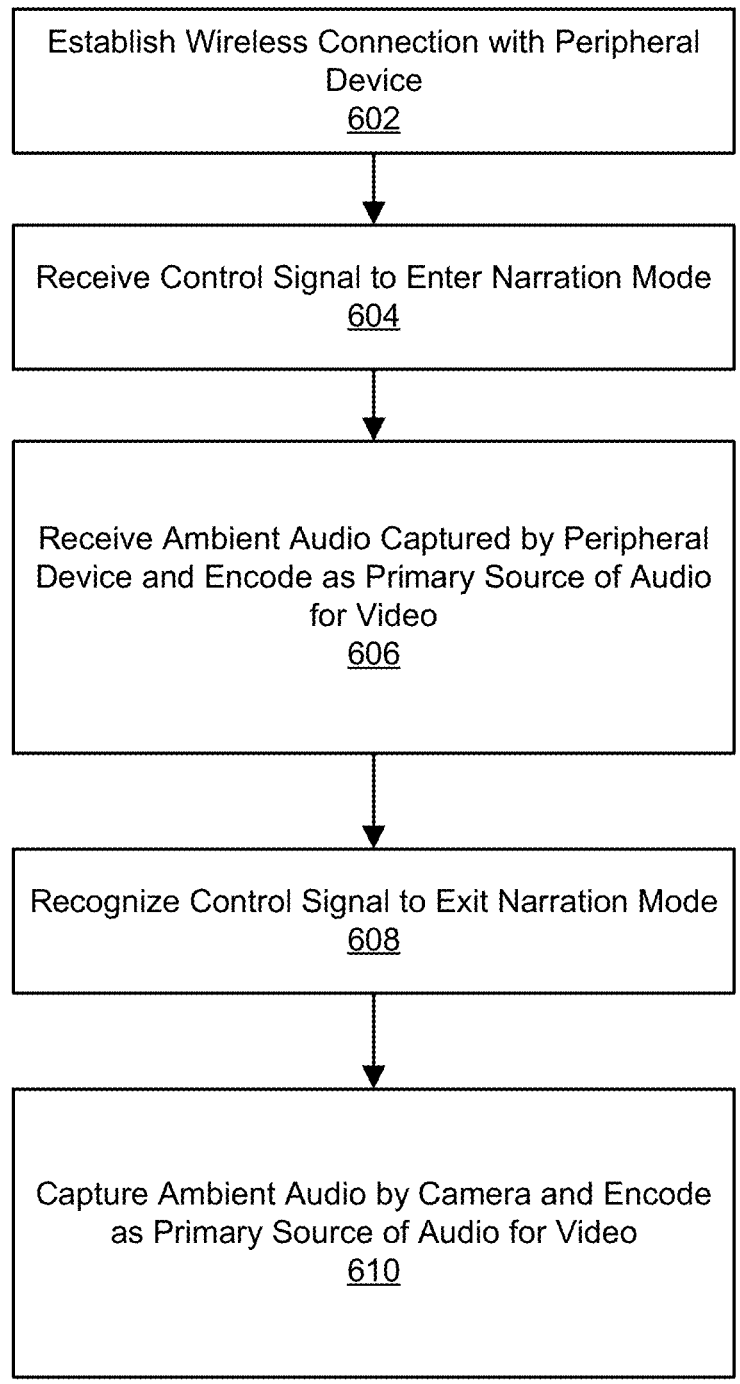
FIG. 6 is a flowchart illustrating an example process for operating a camera connected to a peripheral device in accordance with one embodiment.

FIG. 6 illustrates an embodiment of a process performed by the camera 130 when entering and exiting narration mode. The camera 130 may establish 602 a wireless connection with the peripheral device 110. The camera 130 may receive 604 a control signal from the peripheral device 110 indicative of a request to enter the narration mode. Alternatively, the command may be received on the camera 130 in the form of, for example, a button press or button press sequence on the camera 130. While recording video, the camera 130 may receive 606 ambient audio captured by the peripheral device 110 and may encode it with the video as the primary source of audio. Optionally, the camera 130 may also record audio and store it in association with the video as a secondary source of audio, or the camera 130 may combine the audio from the peripheral device 130 with the audio from the camera 110 based on predefined weights, where the audio from the peripheral device 110 is weighted more heavily since it is the primary source. At a later time, the camera 130 may receive 608 a control signal from the peripheral device 130 to exit the narration mode. Alternatively, the command may be received on the camera 130 in the form of, for example, a button press or button press sequence on the camera 130. While recording video, the camera 130 may capture audio with its integrated microphones and encodes it together with the video as the primary audio source. Optionally, the camera 130 may also receive audio from the peripheral device 110 and store it in association with the video as a secondary source of audio, or the camera 130 may combine the audio from the peripheral device 130 with the audio from the camera 110 based on predefined weights, where the audio from the camera 130 is weighted more heavily since it is the primary source.

Additional Configuration Considerations

In other alternative embodiments, the voice recognition processing may be offloaded from the peripheral device 110 to another device. For example, in one embodiment, the peripheral device 110 passes the captured audio to the camera 130 and the camera 130 performs the voice recognition. In another embodiment, a remote server may receive the captured audio and perform the voice recognition. In yet other embodiments, a mobile device being carried by the user may execute an application that communicates with the peripheral device 110 and performs functions such as voice recognition.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A peripheral device, comprising:
   a wireless communication interface to wirelessly communicate with a camera;
   one or more microphones to capture ambient audio including voice commands;
   a processor to recognize a highlight voice command captured by the one or more microphones, to transmit a highlight tag control signal to control the camera based on the recognized highlight voice command to record a metadata tag at a particular time location within a video when the highlight tag control signal is received by the camera, and to receive an acknowledgment message in response to the camera executing the recognized highlight voice command; and
   a feedback mechanism to provide a feedback signal in response to receiving the acknowledgement message, the feedback signal indicative of the recognized highlight voice command.

2. The peripheral device of claim 1, wherein the feedback mechanism comprises at least one of a haptic feedback device, a speaker, and a display device.

3. The peripheral device of claim 1, wherein the processor is further configured to recognize a start recording voice command and to transmit a start recording control signal to cause the camera to begin recording the video in response to the start recording voice command.

4. The peripheral device of claim 1, wherein the processor is further configured to recognize a stop recording voice command and to transmit a stop recording control signal to the camera to cause the camera to stop recording the video in response to the stop recording voice command.

5. The peripheral device of claim 1, wherein the processor is further configured to recognize a take picture voice command and to transmit a take picture control signal to the camera to cause the camera to take a picture in response to the take picture voice command.

6. The peripheral device of claim 1, wherein the processor is further configured to recognize a narration mode voice command and to configure the peripheral device and the camera to operate in a narration mode in response to the narration mode voice command, wherein when operating in the narration mode, the peripheral device transmits the ambient audio to the camera as a primary source of audio for video captured by the camera.

7. The peripheral device of claim 6, wherein the processor is further configured to recognize a narration mode exit voice command and to configure the peripheral device and the camera to exit the narration mode in response to the narration mode exit voice command, wherein subsequent to exiting the narration mode, the peripheral device transmits the ambient audio to the camera as a secondary source of audio associated with video captured by the camera.

8. A method for operating a peripheral device, comprising:
   capturing, by one or more microphones, ambient audio including voice commands;
   recognizing, by a processor integrated with the peripheral device, a highlight voice command captured by the one or more microphones;

generating, by the processor, a highlight tag control signal to control a camera based on the recognized command to record a metadata tag at a particular time location within a video when the highlight tag control signal is received by the camera;

wirelessly communicating, via a wireless interface, the highlight tag control signal to the camera;

receiving, via the wireless interface, an acknowledgment message in response to the camera executing the recognized highlight voice command; and providing, via a feedback mechanism, a feedback signal in response to receiving the acknowledgement message, the feedback signal indicative of the recognized highlight voice command.

9. The method of claim 8, wherein providing the feedback signal comprises at least one of providing haptic feedback via a haptic feedback device, providing audio feedback via a speaker, and providing visual feedback via a display device.

10. The method of claim 8, further comprising:
recognizing, by the processor integrated with the peripheral device, a start recording voice command captured by the one or more microphones;
generating, by the processor, a start recording control signal to control the camera to begin recording the video in response to the start recording voice command; and
wirelessly communicating, via the wireless interface, the start recording control signal to the camera.

11. The method of claim 8, further comprising:
recognizing, by the processor integrated with the peripheral device, a stop recording voice command captured by the one or more microphones;
generating, by the processor, a stop recording control signal to control the camera to stop recording the video in response to the stop recording voice command; and
wirelessly communicating, via the wireless interface, the stop recording control signal to the camera.

12. The method of claim 8, further comprising:
recognizing, by the processor integrated with the peripheral device, a take picture voice command captured by the one or more microphones;
generating, by the processor, a take picture control signal to control the camera to take a picture in response to the take picture voice command; and
wirelessly communicating, via the wireless interface, the take picture control signal to the camera.

13. The method of claim 8, further comprising:
recognizing, by the processor integrated with the peripheral device, a narration mode voice command captured by the one or more microphones;
configuring the peripheral device and the camera to operate in a narration mode in response to the narration mode voice command; and
when operating in the narration mode, transmitting the ambient audio to the camera as a primary source of audio for the video captured by the camera.

14. The method of claim 13, further comprising:
recognizing, by the processor integrated with the peripheral device, a narration mode exit voice command captured by the one or more microphones;
configuring the peripheral device and the camera to exit the narration mode in response to the narration mode exit voice command; and
subsequent to exiting the narration mode, transmitting the ambient audio to the camera as a secondary source of audio associated with the video captured by the camera.

15. A non-transitory computer-readable storage medium storing instructions that when executed by a processor cause the processor to perform steps including:
capturing ambient audio including voice commands using one or more microphones;
recognizing a highlight voice command captured by the one or more microphones;
generating a highlight tag control signal to control a camera based on the recognized command to record a metadata tag at a particular time location within a video when the highlight tag control signal is received by the camera;
wirelessly communicating the highlight tag control signal to the camera;
receiving an acknowledgment message in response to the camera executing the recognized highlight voice command; and
providing a feedback signal in response to receiving the acknowledgement message, the feedback signal indicative of the recognized highlight voice command.

16. The non-transitory computer-readable storage medium of claim 15, wherein providing the feedback signal comprises at least one of providing haptic feedback via a haptic feedback device, providing audio feedback via a speaker, and providing visual feedback via a display device.

17. The non-transitory computer-readable storage medium of claim 15, the instructions when executed further causing the processor to perform steps including:
recognizing a narration mode voice command captured by the one or more microphones;
configuring the peripheral device and the camera to operate in a narration mode in response to the narration mode voice command; and
when operating in the narration mode, transmitting the ambient audio to the camera as a primary source of audio for the video captured by the camera.

18. The non-transitory computer-readable storage medium of claim 17, the instructions when executed further causing the processor to perform steps including:
recognizing a narration mode exit voice command captured by the one or more microphones;
configuring the peripheral device and the camera to exit the narration mode in response to the narration mode exit voice command; and
subsequent to exiting the narration mode, transmitting the ambient audio to the camera as a secondary source of audio associated with the video captured by the camera.

19. The non-transitory computer-readable storage medium of claim 15, the instructions when executed further causing the processor to perform steps including:
recognizing, by the processor integrated with the peripheral device, a start recording voice command captured by the one or more microphones;
generating, by the processor, a start recording control signal to control the camera to begin recording the video in response to the start recording voice command; and
wirelessly communicating, via the wireless interface, the start recording control signal to the camera.

20. The non-transitory computer-readable storage medium of claim 19, the instructions when executed further causing the processor to perform steps including:
recognizing, by the processor integrated with the peripheral device, a stop recording voice command captured by the one or more microphones;

generating, by the processor, a stop recording control signal to control the camera to stop recording the video in response to the stop recording voice command; and wirelessly communicating, via the wireless interface, the stop recording control signal to the camera.

\* \* \* \* \*